United States Patent
Morrison et al.

(10) Patent No.: US 10,126,456 B2
(45) Date of Patent: Nov. 13, 2018

(54) SYSTEM AND METHOD FOR GROUNDWATER DETECTION AND EVALUATION

(71) Applicant: The Regents of the University of California, Oakland, CA (US)

(72) Inventors: H. Frank Morrison, Berkeley, CA (US); Alessandro Ratti, Berkeley, CA (US); Erika Gasperikova, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 240 days.

(21) Appl. No.: 14/990,718

(22) Filed: Jan. 7, 2016

(65) Prior Publication Data

US 2016/0195631 A1 Jul. 7, 2016

Related U.S. Application Data

(60) Provisional application No. 62/100,805, filed on Jan. 7, 2015.

(51) Int. Cl.
*G01V 3/28* (2006.01)
*G01V 3/12* (2006.01)
*G01V 3/08* (2006.01)

(52) U.S. Cl.
CPC ............... *G01V 3/12* (2013.01); *G01V 3/08* (2013.01); *Y02A 90/344* (2018.01)

(58) Field of Classification Search
CPC ... G01V 3/00; G01V 3/08; G01V 3/81; G01V 3/83; G01V 3/10; G01V 3/26; G01V 3/28; G01V 3/18
See application file for complete search history.

(56) References Cited

U.S. PATENT DOCUMENTS

| | | | |
|---|---|---|---|
| 3,388,355 A | 6/1968 | Myatt et al. | |
| 3,975,674 A | 8/1976 | McEuen | |
| 5,486,764 A * | 1/1996 | Thompson | G01V 1/18 324/323 |
| 5,537,045 A * | 7/1996 | Henderson | G01M 3/16 324/522 |

(Continued)

OTHER PUBLICATIONS

WO, International Search Report, International Application No. PCT/US16/12537, dated Mar. 11, 2016.

(Continued)

*Primary Examiner* — Tung X Nguyen
*Assistant Examiner* — Dominic Hawkins (57) ABSTRACT

A system for mapping a depth of an aquifer and determining the presence and salinity of water from the aquifer and methods for using the making/using the same includes a central processor. One or more horizontal loop transmitters can be coupled to the central processor, wherein said one or more horizontal loop transmitters produce a first half-sine pulse of magnetic field at a first pulse duration for measuring the resistivity of a ground surface. The one or more horizontal loop transmitters can produce a second sequence of half-sine pulses at a second frequency for creating an excitation field for magnetic resonance sounding. A multi-turn receiver loop antenna can also be coupled to the central processor, wherein said multi-turn receiver loop antenna receives an induced magnetic field from said one or more horizontal loop transmitters that is representative of the depth of an aquifer and the salinity of the water.

20 Claims, 8 Drawing Sheets

(56) References Cited

U.S. PATENT DOCUMENTS

| | | | |
|---|---|---|---|
| 7,466,128 B2 | 12/2008 | Walsh | |
| 7,579,833 B2* | 8/2009 | Shorey | G01N 24/081 324/303 |
| 8,720,573 B2* | 5/2014 | Eriksen | B01D 17/06 166/336 |
| 9,551,807 B2* | 1/2017 | Walsh | G01V 3/32 |
| 2003/0050759 A1* | 3/2003 | Srnka | G01V 3/083 702/7 |
| 2007/0255499 A1* | 11/2007 | Strack | G01V 11/00 702/11 |
| 2008/0196509 A1* | 8/2008 | Charette | G01F 1/704 73/861.07 |
| 2012/0286779 A1* | 11/2012 | Walsh | G01R 33/4608 324/309 |
| 2013/0169278 A1* | 7/2013 | Bittar | G01V 3/30 324/338 |
| 2013/0193964 A1* | 8/2013 | Wiley, Sr. | G01N 24/081 324/303 |
| 2014/0056481 A1* | 2/2014 | Zhdanov | G06K 9/00624 382/109 |
| 2014/0084930 A1* | 3/2014 | Dodds | G01V 3/17 324/331 |

OTHER PUBLICATIONS

Akca, I., et al., "Joint parameter estimation from magnetic resonance and vertical electric soundings using a multi-objective genetic algorithm," Geophysical Prospecting, 2014, pp. 364-376, vol. 62.

Hertrich, M., "Imaging of groundwater with nuclear magnetic resonance," Progress in Nuclear Magnetic Resonance Spectroscopy, 2008, pp. 227-248, vol. 53.

Legchenko, A., et al. "A review of the basic principles for proton magnetic resonance sounding measurements" Journal of Applied Geophysics, vol. 50, Issues 1-2, May 2002, pp. 3-19.

Legchenko, A., et al. "Nuclear magnetic resonance as a geophysical tool for hydrogeologists" Elsevier Journal of Applied Geophysics vol. 50, Issues 1-2, May 2002, pp. 21-46.

Jean Roy(2009). "MRS: A new geophysical technique for groundwater work." The Leading Edge, 28(10), 1226-1233.

Behroozmand, A.A., et al. "A Review of the Principles and Applications of the NMR Technique for Near-Surface Characterization" Surveys in Geophysics, Jan. 2015, vol. 36, Issue 1, pp. 27-85.

Misac N. Nabighian, et al. (1991) 6. Time Domain Electromagnetic Prospecting Methods. Electromagnetic Methods in Applied Geophysics: pp. 427-520.

J. D. McNeill (1990) 7. Use of Electromagnetic Methods for Groundwater Studies. Geotechnical and Environmental Geophysics: pp. 191-218.

Goldman, M., et al. "Application of the integrated NMR-TDEM method in groundwater exploration in Israel" Journal of Applied Geophysics, vol. 31, Issues 1-4, Feb. 1994, pp. 27-52.

Yaramanci, U., et al. "Aquifer characterisation using Surface NMR jointly with other geophysical techniques at the Nauen/Berlin test site" Journal of Applied Geophysics, vol. 50, Issues 1-2, May 2002, pp. 47-65.

Meji, M.A., et al. "Surface NMR sounding and inversion to detect groundwater in key aquifers in England: comparisons with VES—TEM methods" Journal of Applied Geophysics, vol. 50, Issues 1-2, May 2002, pp. 95-111.

* cited by examiner

SYSTEM AND METHOD FOR GROUNDWATER DETECTION AND EVALUATION

CROSS-REFERENCE TO RELATED APPLICATIONS

This application claims priority to U.S. Provisional Patent Application Ser. No. 62/100,805, filed on Jan. 7, 2015, the disclosure of which is expressly incorporated herein by reference in its entirety and for all purposes.

GOVERNMENT LICENSE RIGHTS

This invention was made with government support under Contract No. DE-AC02-05CH11231 awarded by U.S. Department of Energy. The government has certain rights in the invention.

FIELD

The present application is directed to systems and methods for groundwater detection and more specifically, but not exclusively, to systems and methods for mapping the depth of aquifers and determining the salinity of groundwater within the aquifers.

BACKGROUND

Groundwater provides the largest source of usable water storage in the United States—accounting for about twenty percent of the world's fresh water supply. Groundwater is subsurface water that fully saturates pores or fractures in soil and rock formations. For example, a unit of water-bearing permeable rock, or unconsolidated sediment, is called an aquifer when the rock formation can yield a usable quantity of water. Aquifers are replenished by the seepage of precipitation that falls on the land above the aquifer but also can be artificially replenished. However, since groundwater is out of sight, locating usable subsurface water is difficult.

In developing countries—or other regions where water is scarce and where irrigation is essential for crops—accurately finding, managing, and preserving groundwater resources is important to avoid costly drilling work. Furthermore, when the groundwater is to be used for drinking water, it is important to identify groundwater of low salinity. To locate groundwater accurately and to determine the depth, quantity, and quality of the groundwater, several techniques must be used, and a target area must be thoroughly tested and studied to identify hydrologic and geologic features important to the planning and management of the water resource.

Existing systems used for groundwater exploration rely on electrical or electromagnetic methods to determine the distribution of electrical resistivity in the subsurface. The resistivity of soil or rock depends on a number of factors including, for example, the porosity, salinity of the pore fluid, water saturation (the degree to which the pore space is filled with water), and on the clay content. Small amounts of clay have a disproportionate effect on lowering the observed resistivity.

Since the resistivity of a given region of the subsurface depends on so many factors, working backwards from resistivity measurements to identify a good freshwater aquifer is highly problematic. The usefulness of resistivity mapping methods for groundwater largely depends on determining the resistivity-depth profile at a location where an aquifer has been identified and then extrapolating its extent through resistivity or transient electromagnetic (TEM) soundings taken laterally away on the surface.

Magnetic resonance sounding (MRS) can be used as a surface measurement tool to investigate the existence, amount, and productiveness of subsurface water. As a variant of nuclear magnetic resonance (NMR), MRS detects total water content of soils and rocks by exciting protons in the water molecules with an externally applied magnetic field at the Larmor frequency. The externally applied magnetic field is usually generated by passing a current at the Larmor frequency, supplied by a current generator, into a single, or a multi-turn, coil of wire on the surface (typically referred to as a loop transmitter). The application of this magnetic field causes the protons in the water molecules to align with the applied field direction throughout the volume of the ground where the magnetic field is large enough to influence the protons. A weak field will only align protons close to the source; whereas, a stronger field will align protons to a greater depth. Accordingly, MRS is accomplished by repeated measurements at gradually increasing strengths of the applied exciting field.

When the applied field is turned off, the aligned protons then precess (or "wobble") around the direction of the Earth's static magnetic field. The precessing proton magnetic moments produce a secondary magnetic field at the Larmor precession frequency that is, in turn, detected by a sensitive magnetic field sensor back on the surface. This magnetic sensor is usually another single or multi-turn loop of wire commonly called a loop receiver. The precession frequency (the Larmor frequency) is a precise function of the value of the local static magnetic field and is known to high accuracy though measurement of the static magnetic field at the sounding site. The amplitude of the Larmor secondary field at the instant cessation of the inducing field is directly proportional to the water content in the volume of the subsurface influenced by the primary inducing field. The decay of the induced Larmor secondary field, called the relaxation time, provides information on the pore structure of the rock or soil formation containing the water.

MRS is sensitive to the spin of the nuclei under investigation (e.g., the spin of the nuclei of hydrogen protons of water molecules—the physical parameter which distinguishes water from any other material in the subsurface) in the presence of a static magnetic field (e.g., the Earth's magnetic field). Nuclei of the same species in different chemical environments (e.g., the hydrogen nuclei in water, benzene, or cyclohexane) possess different resonance frequencies. Therefore, MRS facilitates a direct search for not only groundwater, but also hydrocarbons and some other mineral deposits.

Additional details regarding the MRS method and application for the study of groundwater are discussed in related articles entitled "*A review of the basic principles for proton magnetic resonance sounding measurements,*" Legchenko, A., et al., Journal of Applied Geophysics 50 (2002) 3-19; "*Nuclear magnetic resonance as a geophysical tool for hydrogeologists,*" Legchenko, A., et al., Journal of Applied Geophysics 50 (2002) 21-46 and "*MRS: A new geophysical technique for groundwater work,*" Roy, J., The Leading Edge (October. 2009) 1226-1233, which references are hereby incorporated by reference in their entireties. The most recent review with a description of new excitation pulse sequences for determining accurate relaxation times is presented in: "*A Review of the Principles and applications of the NMR Technique for Near-Surface Characterization,*

Behroozmand et al., Surv. Geophys., Springer, September 2014, which reference also is herein incorporated by reference in its entirety.

Electromagnetic (EM) measurements of ground resistivity are made by inducing currents, usually called Faraday currents, to flow in the subsurface by producing a changing magnetic field from a transmitter loop on the surface. The transmitter loop carries a time changing current that produces a time-varying magnetic field. This time changing current can be a continuous sinusoid of a predetermined frequency. Sinusoidal measurements can be measured in the frequency domain (called a frequency domain measurement). Additionally, the time changing current can also be a pulse of current, which typically appears as a square wave or a half-sine pulse. Pulse currents can be measured in the time domain (called a time domain measurement).

The induced currents in the ground are proportional to the ground conductivity and produce a secondary magnetic field that is measured with a separate receiver. In a central loop configuration for TEM, the transmitter loop is a circular loop, and the receiver is a smaller concentric loop for detecting the secondary field. Such a configuration can operate in the time domain and measurements of the decaying or transient fields after the termination of the pulse are related to the distribution of electrical resistivity in the formations beneath the transmitter-receiver system. A review of transient electromagnetic methods is presented in "Time Domain Electromagnetic Prospecting Methods," Nabighian, M. N., et al., Ed., Electromagnetic Methods in Applied Geophysics, Vol. 2, Parts A and B, Soc. Expl. Geophysics (1991) and "Use of Electromagnetic Methods for Groundwater Studies," McNeill, J. D., Ward, S. H., Ed., Geotechnical and Environmental Geophysics, Vol. 1: Review and Tutorial, Soc. Expl. Geophysics (1990), which references are hereby incorporated by reference in their entireties.

A short pulse of current in the TEM transmitter loop produces a time-varying magnetic field that induces a pattern of concentric currents in the ground that decays after the energizing pulse is terminated. The currents diffuse downwardly and radially outwardly from the transmitter loop, and their rate of decay and the shape of the measured secondary field transient depend on the vertical distribution of electrical resistivity in the ground beneath the transmitter.

The combination of MRS and resistivity mapping removes many ambiguities of conventional electrical-/electromagnetic-based groundwater exploration tools—particularly by identifying the salinity of an aquifer detected by MRS. To date, few surveys have addressed this problem by conducting separate MRS and resistivity mapping measurements at the same site but with different equipment (e.g., "*Application of the integrated NMR—TDEM method in groundwater exploration in Israel*," Goldman, M., et al., Journal of Applied Geophysics 31 (1994) 27-52; "*Aquifer characterization using surface NMR jointly with other geophysical techniques at the Nauen/Berlin test site*," Yaramanci, U., et al., Journal of Applied Geophysics 50 (2002) 47-65; "*Surface NMR sounding and inversion to detect groundwater in key aquifers in England: comparisons with VES-TEM methods*," Meju, M. et al., Journal of Applied Geophysics 50 (2002) 95-111, which references are hereby incorporated by reference in their entireties). Goldman et al., in particular, presents a very succinct rationale for the importance of joint resistivity and MRS measurements in identifying water quality.

In areas where resources are limited (e.g., deployment in developing countries), a field system that combines both techniques in a common instrumentation package using common transmitters and receivers needs to be lightweight, low-power, and requires simple operation to drastically improve the efficiency of fresh groundwater exploration. Accordingly, a need exists for improved systems and methods for groundwater exploration in an effort to overcome the aforementioned obstacles and deficiencies of prior art systems.

SUMMARY

In one embodiment, a system for mapping the depth of an aquifer and determining the salinity of water from the aquifer includes a central processor; one or more horizontal loop transmitters coupled to a central current generator, wherein the central processor controls said central current generator to supply current pulses to said one or more horizontal loop transmitters; one or more horizontal loop receivers coupled to the central processor; an amplifier coupled to said one or more horizontal loop receivers; wherein said one or more horizontal loop transmitters produce a magnetic field waveform, including a first continuous sequence of pulses of alternating polarity and small pulse separation to simulate a continuous waveform at a first frequency for magnetic resonance sounding, and an electromagnetic field waveform including a second sequence of individual half-sine pulses of alternating polarity at a second pulse duration and pulse separation for measuring ground resistivity. The one or more horizontal loop receivers receive an induced secondary magnetic field representative of the depth of the aquifer and the salinity of the water from the aquifer. In some embodiments, the first continuous sequence of pulses includes half-sine pulses. Similarly, the continuous waveform can be represented as a sinusoidal waveform.

BRIEF DESCRIPTION OF THE DRAWINGS

In order to better appreciate how the advantages and objects of the disclosed system and method are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the disclosure. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF PREFERRED EMBODIMENTS

As previously discussed, conventional groundwater exploration systems rely on the electrical resistivity of a given region. However, determining electrical resistivity in the subsurface depends on a number of factors (e.g., porosity, salinity of the pore fluid, water saturation, and so on). For example, small amounts of clay can have a disproportionate effect on lowering the observed resistivity. Because the resistivity of a given region depends on so many factors, working backwards from resistivity measurements to identify a good freshwater aquifer is highly problematic.

Nuclear magnetic resonance (NMR) has been applied to the direct detection of protons in water molecules in the ground and has been shown to offer direct estimators of the depth, thickness and water content of aquifers. Field systems can detect and characterize aquifers as deep as 100 meters or more.

However, conventional magnetic resonance systems alone cannot directly respond to the salinity of the aquifer and, thus, are not directly useful for estimating water quality. An independent measurement of the resistivity distribution in the ground can remove this ambiguity. If an accompanying resistivity survey revealed a high resistivity volume at a predetermined depth, then the aquifer could be reliably identified as having fresh water. On the other hand, if the resistivity was very low, the aquifer would almost certainly have saline water or high clay content, thereby disqualifying the formation as a fresh water aquifer in either case.

Since conducting magnetic resonance and resistivity mapping measurements typically require different controllers, transmitters, receivers, and so on, a common, lightweight instrumentation package for mapping the depth of aquifers at groundwater sites, and for determining the salinity of the water, using a combination of magnetic resonance and ground resistivity mapping can prove desirable in a wide range of applications, including location of subterranean groundwater, hydrocarbon, and mineral deposits. This result can be achieved, according to one embodiment disclosed herein, by a groundwater system 1000, as illustrated in FIG. 1.

Figure 1:
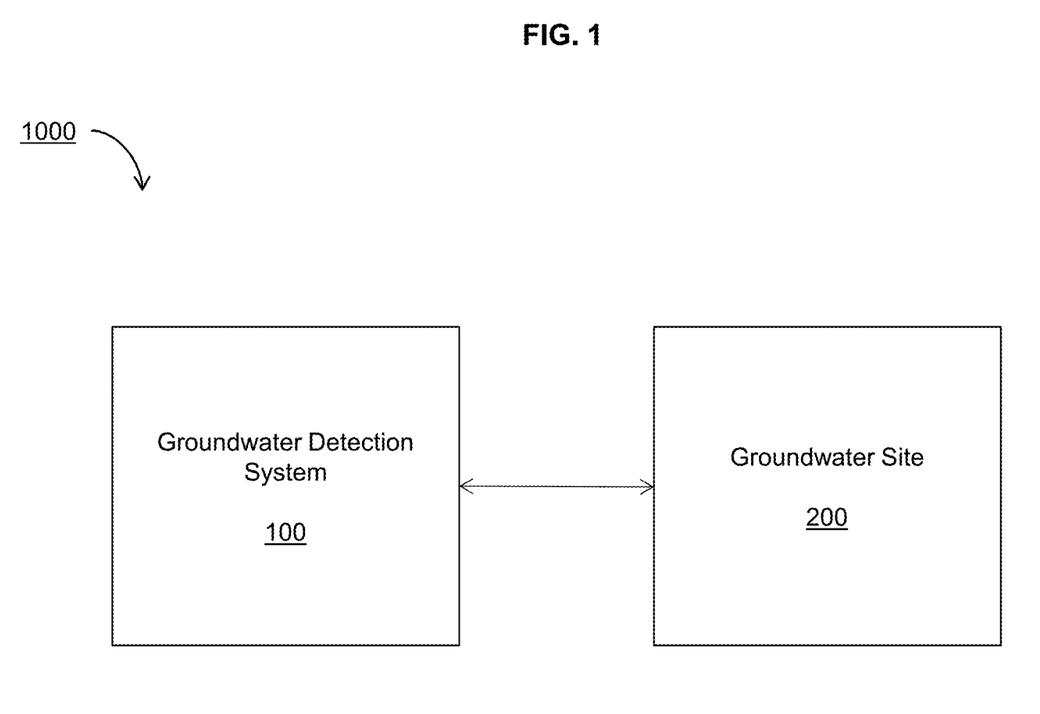
FIG. 1 is an exemplary top-level block diagram illustrating an embodiment of a groundwater detection system for use at a groundwater site.

Turning to FIG. 1, a groundwater detection system 100 can detect quality water (e.g., for field irrigation, human consumption, and so on) at a groundwater site 200. In one embodiment, the groundwater detection system 100 measures the soil conductivity of the groundwater site 200, which soil conductivity directly indicates the saline content as well as the ease of extracting the water. Similarly, the groundwater detection system 100 also measures the presence of water. The groundwater detection system 100 preferably combines multi-sensing systems, such as magnetic resonance sounding (MRS) and/or transient electromagnetic (TEM) ground resistivity mapping methods, in a common instrumentation package. Advantageously, the groundwater detection system 100 can perform multiple functions in a lightweight, portable system that is particularly beneficial for transportation to remote regions where resources are limited.

Figure 2:
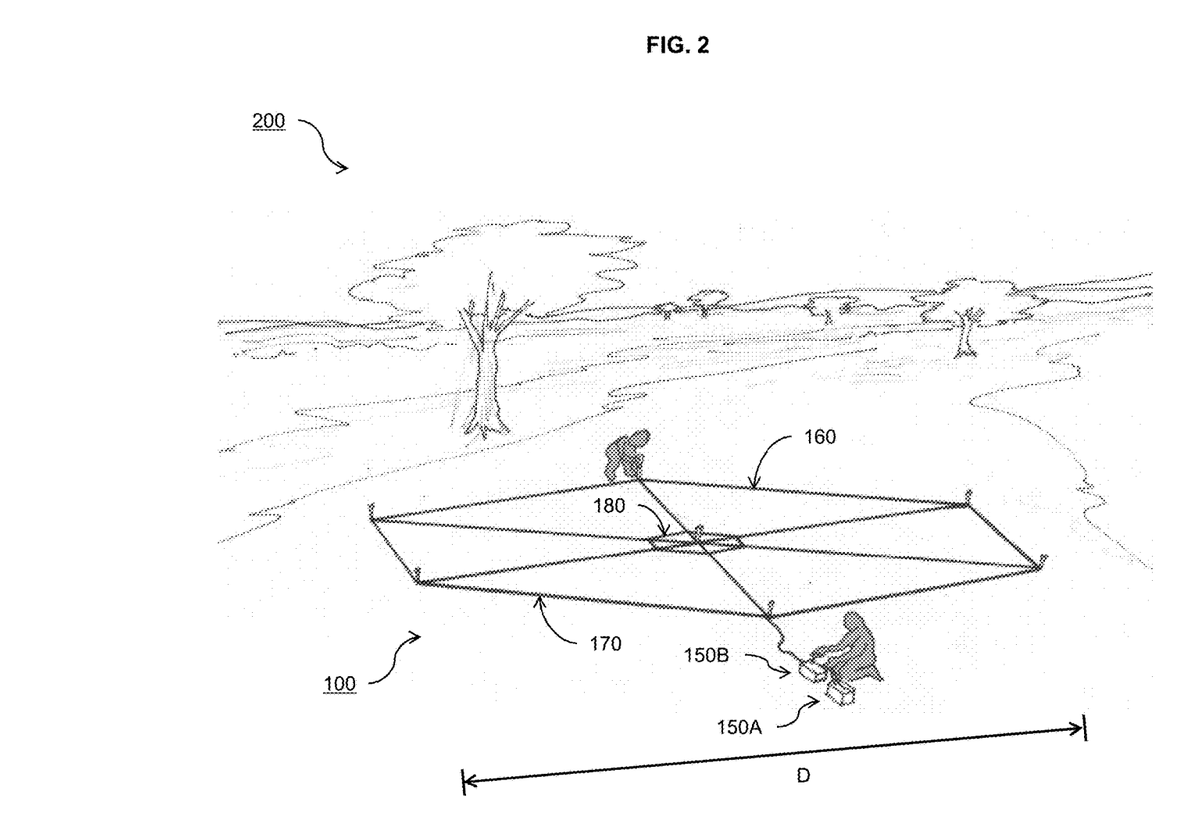
FIG. 2 illustrates a detail drawing of an exemplary application of the groundwater detection system of FIG. 1 at a selected groundwater site.
Figure 5:
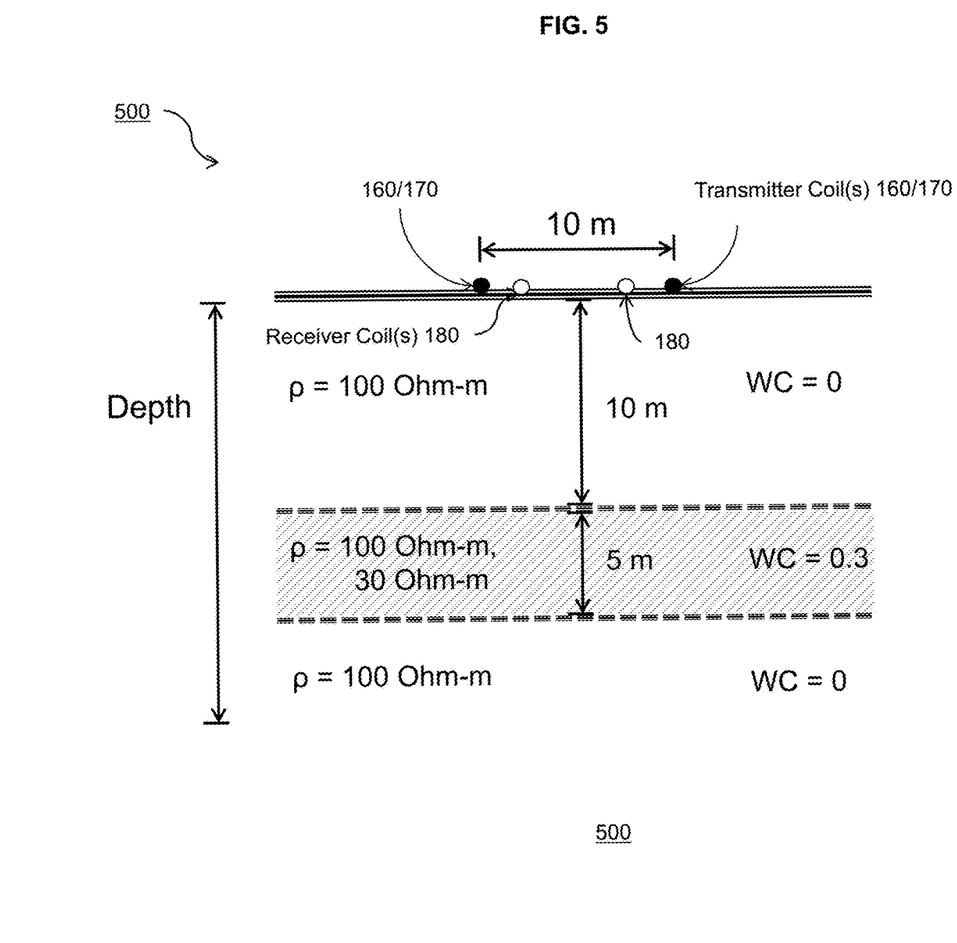
FIG. 5 illustrates one embodiment of a model aquifer that can be located at a groundwater site using the groundwater detection system of FIG. 1.

A variation of NMR—MRS employs a large MRS transmitting loop on the ground surface having a diameter D (shown in FIG. 2) roughly equal to the depth of interest (shown in FIG. 5). With reference to FIG. 2, one embodiment of the groundwater detection system 100 of FIG. 1 at the groundwater site 200 is shown. The groundwater detection system 100 includes a controller 150A for controlling a transmitter excitation system 150B in communication with the large MRS transmitting loop (illustrated as a loop transmitter 160 in FIG. 2). Although illustrated as separate components for exemplary purposes only, the transmitter excitation system 150B and the controller 150A can reside on a single component.

A wave train of length Δt (shown in FIG. 4B) (on the order of tens of milliseconds) of current, for example, alternating at the Larmor frequency, is applied via the transmitter excitation system 150B. In one embodiment, the Larmor frequency is set by the value of the Earth's static magnetic field at the groundwater site 200 being probed. The exciting field causes the protons in the water molecules (e.g., water molecules of any aquifers present at the groundwater site 200) to line up in the applied magnetic field direction.

At the cessation of the exciting pulse (via the applied current), the aligned proton magnetic moments precess about an ambient static magnetic field—at the Larmor frequency—and decay back to an equilibrium state with a time constant of up to tens of milliseconds. These precessing protons create a time varying magnetic field that can be detected on the surface by a multi-turn receiver loop 180 in the vicinity of the transmitting loop (e.g., the loop transmitter 160). Although illustrated and described as a multi-turn loop for illustration only, the multi-turn receiver loop 180 can also include a single receiving loop. The degree of excitation, and hence the amplitude of the induced secondary fields, depends on the excitation moment Q, where Q is the product of the loop current $I_0$ and the pulse length Δt.

This detailed relationship is seen in the expression (Equation 1) for the rotating dipole moment M in a small volume dV created by an exciting pulse Q:

$$dM = M_0 WC \sin\left(\frac{1}{2}\gamma b_\perp^{Tx} Q\right) dV \qquad \text{[Equation 1]}$$

where $M_0$ is the magnetic moment of protons, WC is the volume fraction of water, γ is the proton gyromagnetic ratio, and $b_\perp^{Tx}$ is the component of the exciting field perpendicular to the Earth's magnetic field at the incremental volume dV. Excitation pulse Q is nonlinear—a larger excitation Q does not necessarily lead to a larger change in dipole moment dM, and, hence, to a larger secondary field at the surface of the Earth.

Equation 1 is integrated over the volume of the ground (at groundwater site 200) influenced by the exciting field of a particular transmitter (e.g., the loop transmitter 160) and Earth's field and for a particular distribution of the water content. In one embodiment, the induced magnetization and its decay is measured by measuring the voltage (e.g., from an electromagnetic field (EMF)) induced in the same coil that generated the exciting field (e.g., the loop transmitter 160), now connected to the transmitter excitation system 150B and the controller 150A as a loop antenna receiver. In another embodiment, the induced magnetization and its decay is measured by measuring the voltage induced in a second coil (e.g., the multi-turn receiver loop 180) separated from the transmitter. The voltage induced in the loop antenna receiver (e.g., the loop transmitter 160 and/or the multi-turn receiver loop 180) is a measure of the magnetic field generated by the induced moments of the protons and, consequently, is a measure of the water content in the volume of the ground affected by the exciting field.

In one embodiment, large loops (e.g., 50 to 150 m) are used for the loop transmitter 160. The decay of the induced voltages in the receiver is approximately exponential with a time constant that depends on the pore size of the rock or soil in the aquifer. For example, aquifers containing significant clay and silt have small pore spaces and rapid signal decays; whereas, sands and gravels with large pore sizes typically have very long time constants even though both formations may have the same water content. Therefore, valuable aquifer properties can be derived from MRS decay.

With reference again to FIG. 2, the groundwater detection system 100 also includes a transient electromagnetic (TEM) transmitter 170 and the multi-turn receiver loop 180, both in communication with the controller 150A. As shown in FIG. 2, the loop transmitter 160 and the TEM transmitter 170 use the same coil that is configured for receiving a variety of current pulse signals (e.g., pulse waveforms of FIGS. 4A-B). Different coils advantageously can be used for producing an MRS signal and a TEM signal. In one embodiment, the MRS and TEM measurements can be conducted separately in time at the same location on the surface of the ground.

The effective depth of water detection, or of the resistivity distribution, can depend on the diameter of the loop transmitter 160 and the TEM transmitter 170. For field use, the specification of each component of system 100 can be determined based on the MRS and TEM soundings of the environment (e.g., MRS and TEM soundings of groundwater site 200). For example, in one embodiment, for simple operation for detecting aquifer layers up to approximately 10 m deep, the loop transmitter 160 has a loop radius of approximately 5.0 m with one turn, includes a copper wire having a weight of 10 kg, an amplitude of a Larmor excitation current of 250 A, a pulse repetition period (1/Larmor) of 0.5 msec, a half period of pulse of 0.2 msec, a peak voltage on coil of 490 V, a power dissipation in the coil of 49 Watts, and a power supply voltage of 3.8 V.

As discussed, the TEM transmitter 170 can use the same coil as the loop transmitter 160. However, in an alternative embodiment, the TEM transmitter 170 can use a peak current of only 12.5 A, thereby reducing the required moment to only ~$10^3$. The TEM transmitter 170 can use the similar half-sine pulse as the MRS transmitter 160 with a repetition period of 2.4 msec to allow an off-time measurement window of 1.0 msec. Accordingly, the TEM transmitter 170 then has a peak pulse current of 12.5 A, a peak voltage on the coil of 49 V, a power dissipation in the coil of 0.1 Watts, and a power supply voltage of 0.5 V.

In one embodiment, the receiver loop 180 includes a co-wound receiver of 100 turns of copper wire and a mass of 2 kg. Accordingly, the receiver loop 180 would have an inductance of 0.659 H, a resistance of 760 Ohms, kT noise density of less than 4 nV, a wire diameter of 0.3 mm, and a time constant in a critically damped stage of about 0.025 milliseconds. This time constant can be used to measure the magnetization response and its decay. However, for the TEM transient to be recovered in the micro- to milli-second time window, only 5 to 10 turns of the receiver coil can be used for measuring them. This number of turns reduces the time constant to the order of a few microseconds.

The MRS results for a 10 m diameter loop provide enough information to determine (or estimate) the depth, water content and an estimate of the aquifer thickness. In an alternative embodiment, to determine the depth to the aquifer and its water content would require Q values of only 3.0 and currents of only 75 A. Q values of only 3.0 and currents of only 75 A advantageously drop the weight and power requirements considerably. Alternatively, the groundwater detection system 100 can be operated at low power in an exploration mode to detect water and then switched to a high power mode for characterizing the detected aquifer.

Figure 3:
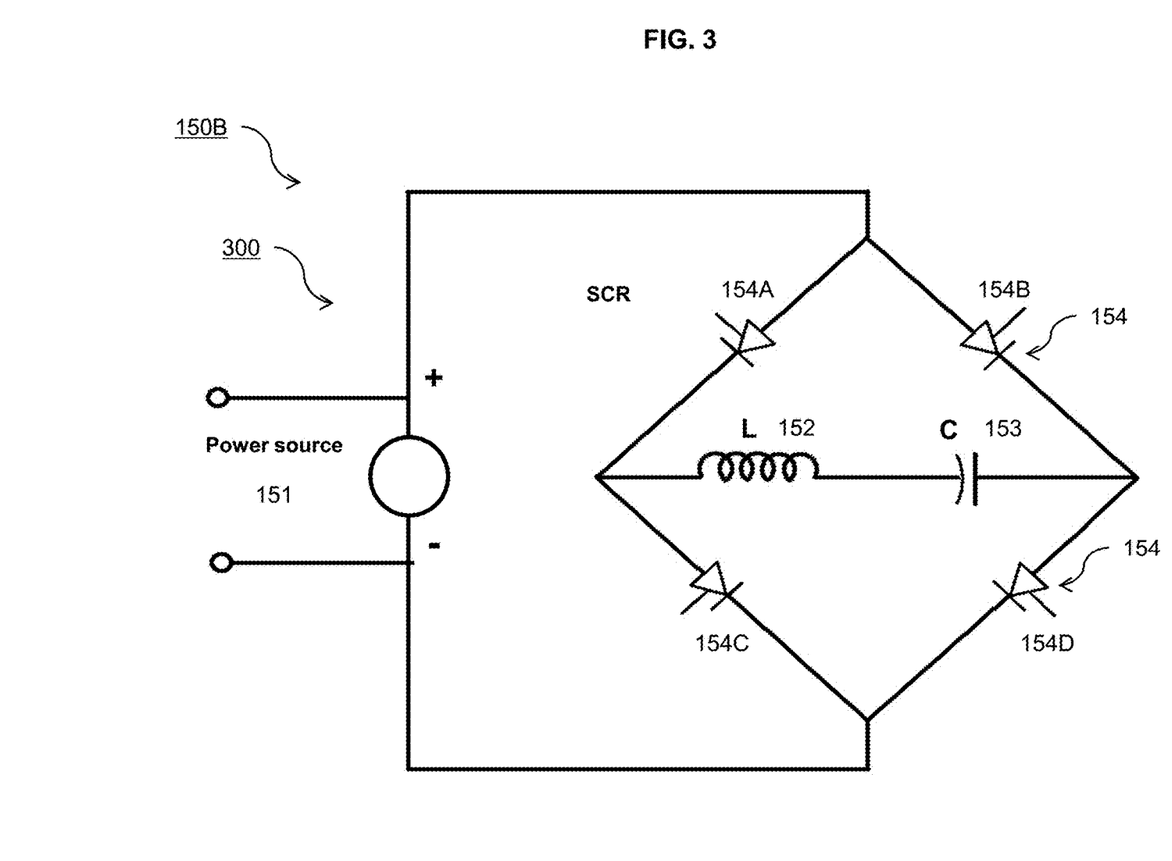
FIG. 3 is an exemplary circuit diagram illustrating an embodiment of an excitation system that can be used with the control system for the groundwater detection system of FIG. 1.
Figure 4A:
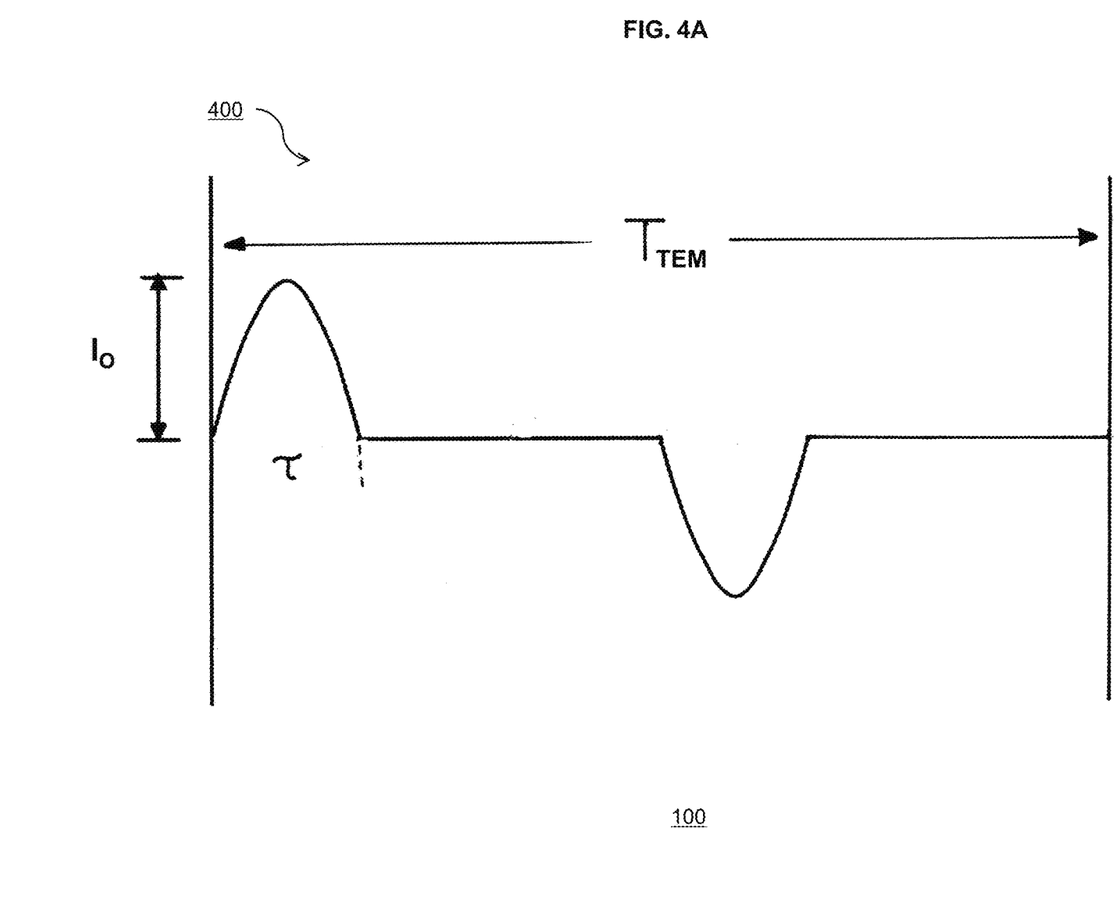
FIG. 4A is an exemplary waveform illustrating an embodiment of the current that can be produced for transient electromagnetic measurements by the circuit of FIG. 3.
Figure 4B:
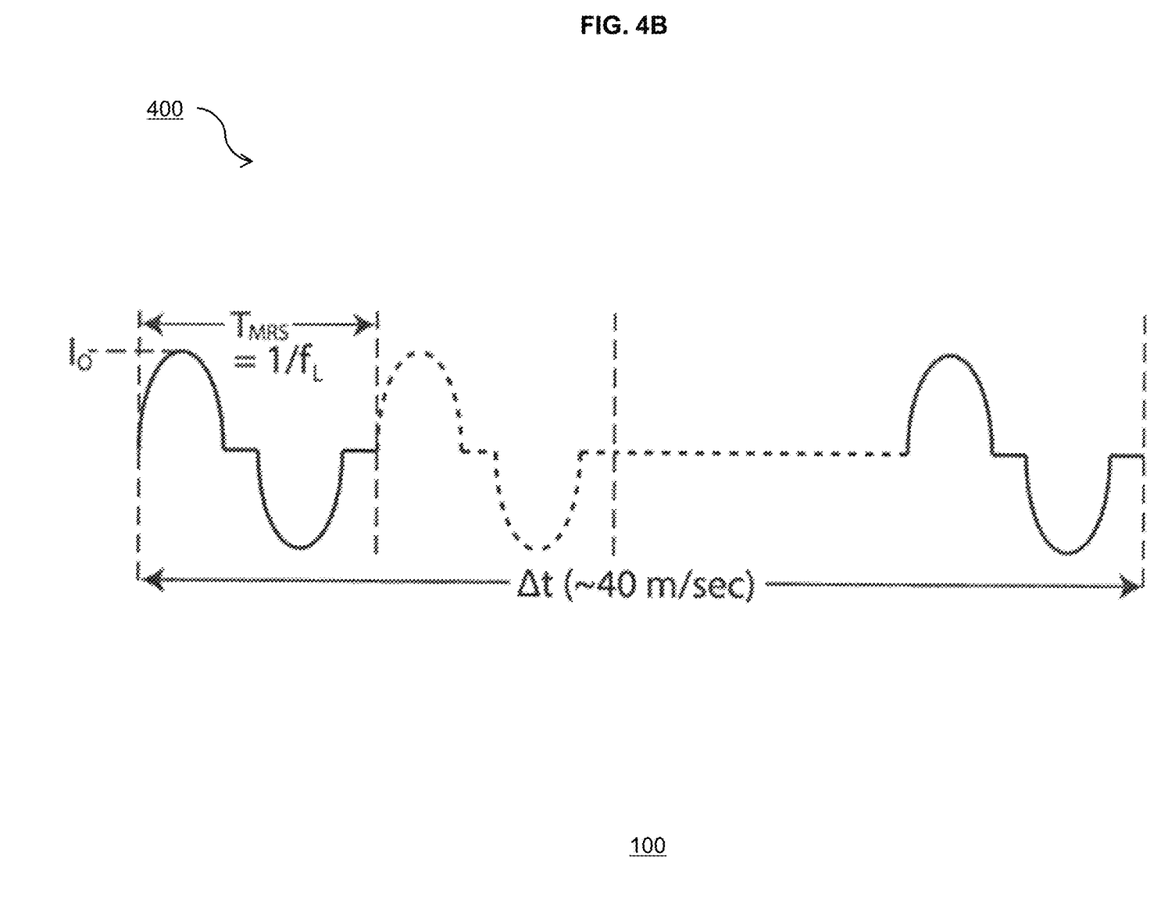
FIG. 4B is an exemplary waveform illustrating an alternative embodiment of the current that can be produced for magnetic resonance sounding measurements by the circuit of FIG. 3.

With reference to FIG. 3, an exemplary pulser circuit diagram 300 of the transmitter excitation system 150B for generating the bipolar half-sign pulse that can be used with the groundwater detection system 100 is illustrated. In one embodiment, the pulser circuit diagram 300 is shown as including a power source 151, which preferably represents a DC power supply. At a predetermined repetition rate, the voltage of the power source 151 is fed into an inductor 152 (e.g., the TEM transmitter 170/loop transmitter 160) and a capacitor 153 connected in series, thereby resulting in an LC oscillator. Current controlling devices 154, such as silicon-controlled rectifiers, restrict the sense of the current flowing into the resulting LC oscillator to produce the bipolar half-sine current waveform 200 with a series of pulses shown in FIGS. 4A and B. With reference to FIGS. 3 and 4A-B, the length τ of the pulse is determined by the values of the inductor 152 and the capacitor 153 according to the equation $\tau = \pi \times \sqrt{LC}$.

In the circuit diagram 300, current flows into and out of the inductor 152 as a sinusoid with a half-period of $1/(2\, f_R)$, where $f_R$ is the resonant frequency of the tuned LC oscillator of FIG. 3. The current leaving the inductor 152 for the capacitor 153 crosses zero, and the switch (e.g., an SCR) opens leaving the energy in the capacitor 153. Specifically, the transmitter excitation system 150B begins with current controlling devices 154A, 154D in a closed position; while, current controlling devices 154B, 154C are open to have current flowing through the inductor 152 to the capacitor 153. The next trigger pulse opens the switch (i.e., current controlling devices 154A, 154D are open and current controlling devices 154B, 154C are closed) to connect the capacitor 153 to the loop transmitter 160, creating another half-sine current pulse of opposite polarity through the loop transmitter 160.

Controller 150A repeats the switching of the current controlling devices 154 to create a continuous, alternating polarity, repetitive waveform, such as shown in FIG. 4B. This pulser circuit 300 is particularly effective for driving inductors because the high voltage incurred in driving a high frequency current in the inductor occurs across the LC combination of inductor 152 and capacitor 153 and not across the power supply 151. In fact, if the resistance of the transmitter loop 160 is low (meaning the weight is high), the voltage and power requirements are very low for achieving high currents in the transmitter.

Additionally, the overall period, $T_{MRS}$ (shown in FIG. 4B) can be set accurately by the control pulses that initiate each half-sine pulse of the pulser circuit 300. The fundamental output frequency can therefore be set to exactly the Larmor frequency for a particular groundwater site 200. By simply expanding the pulse duration (e.g., until there is a very small off-time of the pulse), almost all the energy is concentrated in the fundamental harmonic of the waveform—the Larmor frequency. This is difficult to achieve in existing MRS systems that attempt to simply drive the desired frequency in the inductor by raising the voltage (often to thousands of volts). The resulting power supplies required are expensive and heavy. Alternatively, conventional MRS systems can resonate the loop inductor with a tuning capacitor, but a tuning capacitor requires large sets of capacitors to fine-tune the exciting field to the Larmor frequency at each new site. Failure to excite the protons at exactly their Larmor frequency can lead to a decrease of the resonant proton magnetization and very weak response signals.

As a further advantage, the pulser circuit 300 can instantly change the excitation frequency to match the observed Larmor frequency. For example, a first MRS sounding can exhibit a power spectrum showing an attenuated return signal from the aquifer at a frequency slightly different from the Larmor frequency predicted from the magnetic field measurements. The transmitted field frequency can then be adjusted to match the observed Larmor frequency, thereby obtaining the correct, and larger, amplitude response.

Additionally, the pulser circuit 300 generates a pulse sequence that has an arbitrary length and that can be shut off almost instantly, simply by not initiating another pulse after the last one of the desired sequence shuts itself off. Accordingly, a measurement of secondary fields can be made as soon as the exciting field is shut off. Conventional systems (e.g., system using continuous sinusoidal currents in a tuned resonant circuit) have a significant "dead time" where the transmitter current is being shut off and secondary fields cannot be measured. This early time response has a transient behavior that is important for characterizing the magnetic resonance response in a formation with tightly bound water that has a very fast decay. Accordingly, the pulser circuit 300 advantageously generates a precise sinusoidal current waveform of the Larmor frequency of a predetermined duration with no-shut off transient ("dead time") for MRS excitation.

As an additional benefit, the pulse sequence of FIG. 4B, the duration and starting time of pulses (shown in FIG. 4B) generated by the pulser circuit 300 is accurately determined by the central controller 150A (e.g., using a central processor coupled to the controller 150A (not shown)). Therefore, arbitrary pulse sequences of a specified duration and separation in time can be generated, each sequence having a specified phase shift with respect to the last, which greatly facilitates the use of advanced pulse sequence-decay measurement schemes such as a Car-Purcel-Meiboom-Gill (CPMG) pulse sequence or the Saturation Recovery Pulse Sequence. These individual half-sine current pulses having a predetermined time interval between pulses makes for better TEM resistivity sounding. Additional information regarding advanced pulse sequence-decay measurements are described in "A Review of the Principles and applications of the NMR Technique for Near-Surface Characterization," Behroozmand et al., Surv Geophys, Springer, September 2014.

As an additional benefit, the controller 150A can further reshape the pulses generated by the pulser circuit 300 for TEM mapping while using the same transmitter coil from the MRS mapping. Stated in another way, TEM transmitter 170—being the same transmitter loop as the loop transmitter 160—can be configured to apply single current pulses (e.g., shown in FIG. 4A) that create a time varying magnetic field that induces Faraday currents in the ground at groundwater site 200 (shown in FIG. 2). The induced currents decay after the energizing pulse is shut off and produces a secondary magnetic field also detected by the receiver loop 180 without a "dead time." The voltage induced in the multi-turn receiver loop 180 is equal to the time rate of change of the secondary magnetic field B at the receiver and the product of the area of the receiver A and the number of turns N, i.e., V=NA dB/dt. The characteristics of the secondary magnetic field depend on the resistivity distribution in the ground.

Therefore, using the controller 150A, the groundwater detection system 100 can quickly transition between MRS and TEM mapping. Similarly, the controller 150A can determine the choice of Larmor frequency for MRS or pulse repetition rate for TEM and current amplitude for both. Using the common instrumentation of the groundwater detection system 100, the controller 150A can identify the depth of aquifers as well as the salinity of the available water.

Turning to FIG. 5, a simplified exemplary cross-section of an aquifer model 500 is shown. The aquifer 500 is at a depth of 10 m, is 5 m thick, and has a water content (WC) of 0.3 (i.e., 30% porosity, fully saturated). The resistivity of the aquifer is either 100 Ohm-m for a fresh water aquifer or 30 Ohm-m for a saline aquifer. The groundwater detection system 100 can be used to map the depth and determine the salinity of the water of the aquifer 500. Exemplary model results 600 are illustrated in FIGS. 6A-B.

Figure 6A:
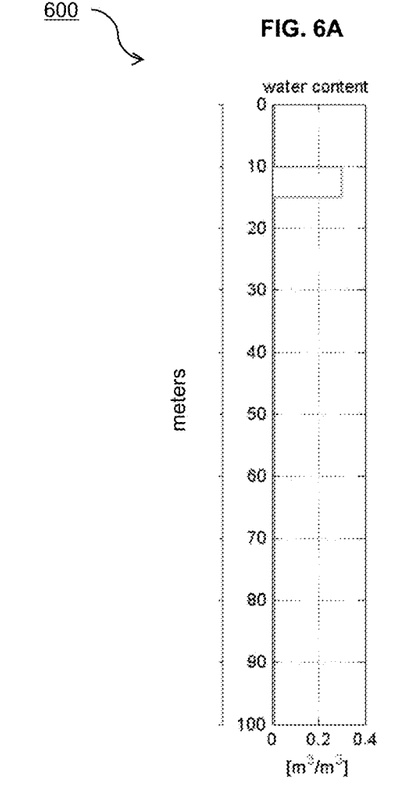
FIG. 6A illustrates one embodiment of the exemplary characteristics of the water content of the model aquifer of FIG. 5.
Figure 6B:
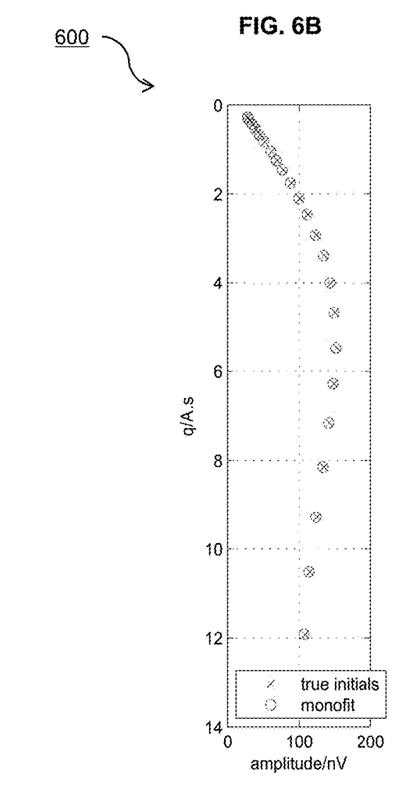
FIG. 6B illustrates one embodiment of the exemplary characteristics of the voltage signal produced by stimulated water molecules in the aquifer of FIG. 5.

Assuming a horizontal loop transmitter 160 (same loop as TEM transmitter 170) of diameter 10 meters and a static earth field of 55,000 nanoTeslas (nT) with an inclination of 45°, FIG. 6A illustrates the water content of the aquifer 500 and FIG. 6B shows the voltage induced in a coil (e.g., receiver coil 180) of 100 turns coaxial with the transmitter coil and of nearly the same radius. The induced voltage is plotted in nanoVolts (nV) against Q. The pulse length is 40 msec. FIG. 6B shows the typical characteristics of an MRS sounding. At low values of the Q of the exciting field, there is stimulation of water molecules near the surface. For the water content versus depth model of FIG. 6A, there is no water near the surface so the response, the voltage induced in the receiver, is small. As Q increases, the penetration of the exciting field increases and the water in the aquifer produces a larger response. At high Q values, the total volume excited becomes very large, and the fraction contributing to the response diminishes. If the aquifer was deeper, the whole response curve would have smaller amplitude and be shifted to larger Q values. The amplitude and shape of these Q curves are used to infer the distribution of water with depth.

Figure 7:
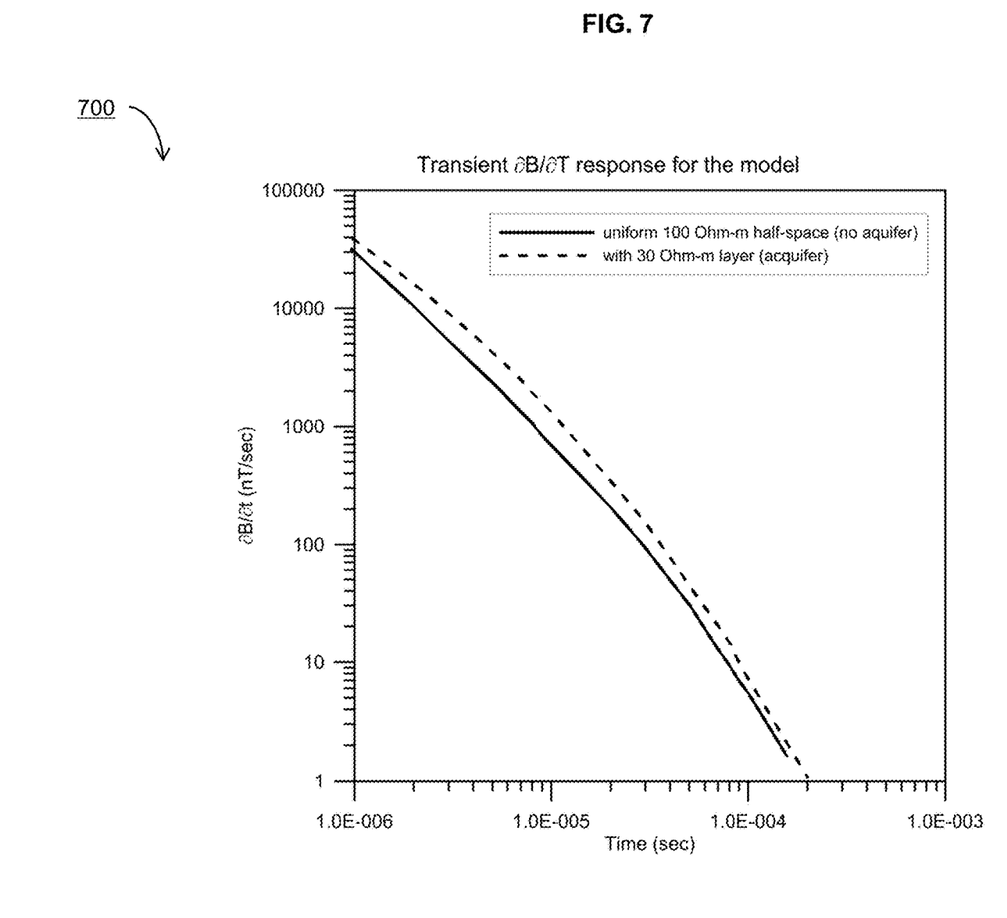
FIG. 7 illustrates one embodiment of the transient magnetic fields produced by the groundwater detection system of FIG. 1.

Turning to FIG. 7, the transient fields 700 for the TEM transmitter 170, using the same loop diameter with reference to FIGS. 6A-B, are shown. The transient response uses a step-off current of one Ampere in the transmitter loop and is plotted as measured at the center of the loop with a point source receiver. The transients are plotted for a uniform half-space of 100 Ohm-m and for the three-layer model aquifer 500 of FIG. 5, where the middle layer aquifer has a lower, 30 Ohm-m, resistivity (e.g., an aquifer with 30% porosity filled with water of 2,200 ppm salinity). The saline aquifer is well defined, and the groundwater detection system 100 can identify that the aquifer had potable water. The transient amplitudes for a half-sine pulse of one-Ampere peak current would not be significantly less and would show the same sensitivity to the layer structure.

In another embodiment, with a current of 125 A, the transient amplitudes are increased by a factor of 125. The transient value of $\partial B/\partial t$ at 0.1 millisecond ($10^{-4}$ seconds) in FIG. 7 is $\sim 7 \times 10^{-8}$ (with a transmitter current of 125 A, this would rise to $8.8\times10^{-6}$). For this field to be uniform over the area of a 100-turn loop: the induced EMF is, $NA \cdot \partial B/\partial t$ or $100 \times 78.5 \times \partial B/\partial t$, which equals $5.5\times10^{-4}$ V (0.55 mV). This indicates that much lower currents could be used for the TEM mode of operation.

In one embodiment, the groundwater detection system 100 is used in developing countries for the rapid location of optimum sites for drilling or digging simple wells for potable water. The groundwater detection system 100 has low-power, provides for simple operation and, for production models, is cheap to replicate. An increase in power and operating cost would render system 100 superior to conventional systems currently in use for groundwater studies. The groundwater detection system 100 disclosed herein can be scaled up to provide depths of exploration to 100 meters or more.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

The language used to disclose various embodiments describes, but should not limit, the scope of the claims. For example, in the following description, for purposes of clarity and conciseness of the description, not all of the numerous components shown in the schematic are described. The numerous components are shown in the drawings to provide a person of ordinary skill in the art a thorough enabling disclosure of the disclosed embodiments. The operation of many of the components would be understood and apparent to one skilled in the art. Similarly, the reader is to understand that the specific ordering and combination of process actions described is merely illustrative, and the disclosure may be performed using different or additional process actions, or a different combination of process actions.

Each of the additional features and teachings disclosed herein can be utilized separately or in conjunction with other features and teachings to provide methods and systems for mapping an aquifer and determining the salinity of the water. Representative examples using many of these additional features and teachings, both separately and in combination, are described in further detail with reference to the attached drawings. This detailed description is merely intended for illustration purposes to teach a person of skill in the art further details for practicing preferred aspects of the present teachings and is not intended to limit the scope of the claims. Therefore, combinations of features disclosed in the detailed description may not be necessary to practice the teachings in the broadest sense, and are instead taught merely to describe particularly representative examples of the present disclosure. Additionally and obviously, features may be added or subtracted as desired without departing from the broader spirit and scope of the disclosure. Accordingly, the disclosure is not to be restricted except in light of the attached claims and their equivalents.

What is claimed is:

1. A system for mapping an aquifer and determining salinity of water in the aquifer, the system comprising:
    a central processor, the central processor including a pulse current generator;
    a loop transmitter coupled to the pulse current generator, the loop transmitter configured to be disposed entirely on a surface of a ground, the loop transmitter operable to produce an electromagnetic waveform pulse for ground resistivity measurements and a magnetic field waveform pulse for magnetic resonance sounding measurements; and
    a receiver loop antenna coupled to the central processor, the receiver loop antenna configured to be disposed entirely on the surface of the ground, the receiver loop antenna operable to receive an induced magnetic field caused by the loop transmitter, the induced magnetic field being representative of depth of the aquifer, water content of the aquifer, the water content of the aquifer being an amount of the water in the aquifer, and the salinity of the water.

2. The system of claim 1, wherein the loop transmitter is further operable to instantaneously terminate at least one of the electromagnetic waveform pulse and the magnetic field waveform pulse to allow the receiver loop antenna to receive the induced magnetic field at an early stage of its transient decay.

3. The system of claim 1, wherein the electromagnetic waveform pulse includes a first half-sine pulse of magnetic field at a first pulse width.

4. The system of claim 1, wherein the magnetic field waveform pulse includes a half-sine pulse simulating a continuous sinusoid at a Larmor frequency to create an excitation field for water molecules in the aquifer, and wherein the Larmor frequency is a function of earth's static magnetic field at the aquifer.

5. The system of claim 1, wherein the receiver loop antenna is a single-turn receiver loop antenna.

6. The system of claim 1, wherein the loop transmitter a single-turn loop transmitter.

7. The system of claim 1, wherein the induced magnetic field is received from at least one of magnetically induced currents in electrically conducting ground of the aquifer and fields from induced magnetization of water molecules in the aquifer.

8. The system of claim 1, wherein the loop transmitter is one of a plurality of loop transmitters.

9. The system of claim 8, wherein the loop transmitter is a multi-turn loop transmitter.

10. The system of claim 1, wherein the receiver loop antenna is a multi-turn receiver loop antenna.

11. The system of claim 1, wherein a diameter of the loop antenna is about the depth of the aquifer.

12. A method for mapping an aquifer and determining salinity of water in the aquifer, the method comprising:
    producing an electromagnetic waveform pulse for ground resistivity measurements with a loop transmitter coupled to a pulse current generator of a central processor, the loop transmitter being disposed entirely on a surface of a ground;
    producing a magnetic field waveform pulse for magnetic resonance sounding measurements with the loop transmitter; and
    receiving an induced magnetic field caused by the electromagnetic waveform pulse and the magnetic field waveform pulse with a receiver loop antenna coupled to the central processor, the induced magnetic field being representative of depth of the aquifer, water content of the aquifer, the water content of the aquifer being an amount of the water in the aquifer, and the salinity of the water, the receiving loop antenna being disposed entirely on the surface of the ground.

13. The method of claim 12, wherein producing the electromagnetic waveform pulse generates a first half-sine pulse of magnetic field at a first pulse width.

14. The method of claim 12, wherein producing the magnetic field waveform pulse generates a half-sine pulse simulating a continuous sinusoid at a predicted Larmor frequency for creating an excitation field for water molecules in the aquifer, and wherein the Larmor frequency is a function of earth's static magnetic field at the aquifer.

15. The method of claim 14, further comprising:
observing an actual Larmor frequency based on a first pulse of the electromagnetic waveform pulse; and
adjusting the magnetic field waveform pulse to the actual Larmor frequency.

16. The method of claim 12, wherein producing the magnetic field waveform pulse generates a continuous sinusoid of a specified length and a specified amplitude and switches to an alternating sequence of half-sine pulses spaced apart in time.

17. The method of claim 12, wherein receiving the induced magnetic field includes receiving the induced magnetic field from at least one of magnetically induced currents in electrically conducting ground of the aquifer and fields from the induced magnetization of water molecules in the aquifer.

18. The method of claim 12, further comprising:
instantaneously terminating the electromagnetic waveform pulse and the magnetic field waveform pulse to allow the receiver loop antenna to receive the induced magnetic field at an early stage of its transient decay.

19. The method of claim 12, further comprising:
determining when the water is potable water.

20. A portable system for mapping an aquifer and determining salinity of water in the aquifer, the system comprising:
a central processor, the central processor including a pulse current generator;
a loop transmitter coupled to the pulse current generator, the loop transmitter configured to be disposed entirely on a surface of a ground, the loop transmitter operable to produce an electromagnetic waveform pulse for ground resistivity measurements and a magnetic field waveform pulse for magnetic resonance sounding measurements; and
a receiver loop antenna coupled to the central processor, the receiver loop antenna configured to be disposed entirely on the surface of the ground, the receiver loop antenna operable to receive an induced magnetic field caused by the loop transmitter, the induced magnetic field being representative of depth of the aquifer, water content of the aquifer, the water content of the aquifer being an amount of the water in the aquifer, and the salinity of the water.

* * * * *